US011100232B1

(12) United States Patent
Juncker et al.

(10) Patent No.: US 11,100,232 B1
(45) Date of Patent: Aug. 24, 2021

(54) SYSTEMS AND METHODS TO AUTOMATE NETWORKED DEVICE SECURITY RESPONSE PRIORITY BY USER ROLE DETECTION

(71) Applicant: Ivanti, Inc., South Jordan, UT (US)

(72) Inventors: Robert M. Juncker, Farmington, MN (US); David B. Morley, Highland, UT (US); Andrew Moravec, Hugo, MN (US)

(73) Assignee: Ivanti, Inc., South Jordan, UT (US)

( * ) Notice: Subject to any disclaimer, the term of this patent is extended or adjusted under 35 U.S.C. 154(b) by 163 days.

(21) Appl. No.: 15/902,271

(22) Filed: Feb. 22, 2018

Related U.S. Application Data

(60) Provisional application No. 62/462,768, filed on Feb. 23, 2017.

(51) Int. Cl.
| | | |
|---|---|---|
| *G06F 21/57* | (2013.01) | |
| *H04L 29/06* | (2006.01) | |
| *G06F 21/60* | (2013.01) | |
| *G06F 21/62* | (2013.01) | |

(52) U.S. Cl.
CPC .......... *G06F 21/577* (2013.01); *G06F 21/604* (2013.01); *G06F 21/6218* (2013.01); *H04L 63/102* (2013.01); *H04L 63/20* (2013.01); *G06F 2221/034* (2013.01)

(58) Field of Classification Search
CPC .. G06F 21/577; G06F 21/604; G06F 21/6218; G06F 21/552; G06F 2221/2141; G06F 2221/2145; G06F 2221/2149; G06F 2221/034; H04L 63/20; H04L 63/102
See application file for complete search history.

(56) References Cited

U.S. PATENT DOCUMENTS

| | | | | |
|---|---|---|---|---|
| 9,749,311 | B2* | 8/2017 | Jayanti Venkata | ........ G06F 8/60 |
| 2007/0143851 | A1* | 6/2007 | Nicodemus | ........... H04L 63/105 |
| | | | | 726/25 |

(Continued)

OTHER PUBLICATIONS

International Search Report and Written Opinion for International Application No. PCT/US2018/019936, dated Apr. 18, 2018, 12 pages.

(Continued)

*Primary Examiner* — Kevin Bechtel
*Assistant Examiner* — Sangseok Park

(57) ABSTRACT

An apparatus includes a processor and a memory operatively coupled to the processor. The processor is configured to automatically send queries to client devices, and to receive responses from the client devices in response to the queries. The processor is configured to identify, based on the responses and on role information stored in an Active Directory database, roles of current users of the client devices and identify based on the roles security risks associated with the client devices. The roles can differ among users. The processor is configured to select a remedial action for at least one of the client devices based on the security risk associated with that client device, and is configured to implement the remedial action on that client device. The processor is configured to not select a remedial action for another of the client devices based on the security risk associated with that client device.

21 Claims, 8 Drawing Sheets

(56) References Cited

U.S. PATENT DOCUMENTS

| | | | |
|---|---|---|---|
| 2008/0263543 A1* | 10/2008 | Ramachandran | G06F 8/61 717/177 |
| 2009/0293121 A1 | 11/2009 | Bigus et al. | |
| 2013/0254833 A1 | 9/2013 | Nicodemus et al. | |
| 2014/0109168 A1 | 4/2014 | Ashley et al. | |
| 2014/0245376 A1 | 8/2014 | Hibbert et al. | |
| 2016/0306965 A1 | 10/2016 | Iyer et al. | |

OTHER PUBLICATIONS

International Search Report and Written Opinion for International Application No. PCT/US2018/019940, dated Apr. 17, 2018, 11 pages.

Tanium, Inc., Tanium Architecture, Data Sheet, "Tanium's patented endpoint communications architecture provides 15-second visibility and control across every endpoint on the network, and can easily scale to millions of endpoints without requiring ongoing infrastructure additions." 2015, 2 pages.

* cited by examiner

SYSTEMS AND METHODS TO AUTOMATE NETWORKED DEVICE SECURITY RESPONSE PRIORITY BY USER ROLE DETECTION

CROSS-REFERENCE TO RELATED APPLICATIONS

This application claims the benefit of U.S. Provisional Patent Application No. 62/462,768, filed Feb. 23, 2017 and titled "Systems and Methods to Automate Security Response Priority by User Role Detection," the entirety of which is incorporated by reference herein in its entirety.

TECHNICAL FIELD

The present disclosure generally relates to computers and computer-related technology. More specifically, the present disclosure relates to systems and methods to automate security response priority by user role detection.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multiprocessor computer systems. These computers include software, such as applications including user interfaces, to make them useful and accessible to an end user. Computers are increasingly linked with other computers through networks. With the expansion of computer technology, the size of networks has continued to increase. Networks may link computers together that are a large geographical distance apart.

One of the challenges involved with networks is providing computer security. However, security can become an over-solved problem. For example, a high level of security may be provided by preventing all computing devices in a network from installing software or accessing the internet, but this may create problems for the operations of an organization.

Accordingly, a need exists for systems and methods for implementing security policies in a more targeted manner while still effectively ensuring a high level of security.

SUMMARY

An apparatus includes a processor and a memory operatively coupled to the processor. The processor is configured to automatically send queries to client devices, and to receive responses from the client devices in response to the queries. The processor is configured to identify, based on the responses and on role information stored in an Active Directory database, roles of current users of the client devices and identify, based on the roles, security risks associated with the client devices. The roles can differ among users. The processor is configured to select a remedial action for at least one of the client devices based on the security risk associated with that client device, and is configured to implement the remedial action on that client device. The processor is configured to not select a remedial action for another of the client devices based on the security risk associated with that client device.

DETAILED DESCRIPTION

Figure 1A:
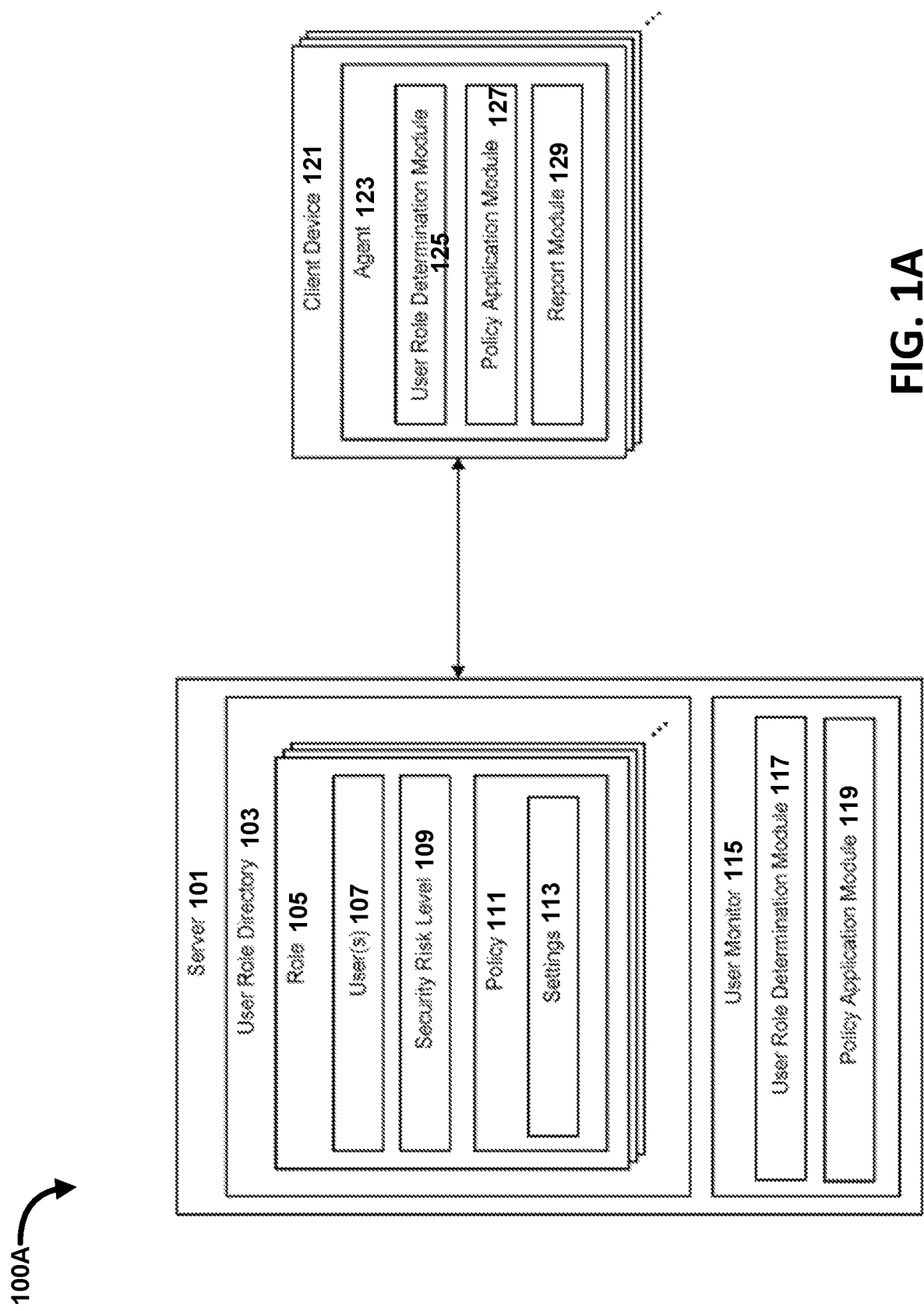
FIG. 1A is a block diagram illustrating a networked system for automating security response priority by user role detection, according to an embodiment.

Instead of static and rigid security approaches, benefits may be realized with systems and methods described herein, in which security response and/or prioritization thereof is performed automatically and/or based on user role detection. In some embodiments, a computing device includes a processor and a memory operatively coupled to the processor. The processor is configured to automatically send queries to client devices, and to receive responses from the client devices in response to the queries. The processor is configured to identify, based on the responses and on role information stored in an Active Directory database, roles of current users of the client devices and identify, based on the roles, security risks associated with the client devices. Identifying the security risks can be based on device information (e.g., received as part of the response to the query). The roles can differ among users. The processor is configured to select a remedial action for one of the client devices based on the security risk associated with that client device, and implement the remedial action on that client device. The processor is configured to not select a remedial action for another of the client devices based on the security risk associated with that client device. The remedial action can include, for example, changing a setting of the first client device, permitting remote control of the first client device, preventing remote control of the first client device, limiting remote control of the first client device, disabling the first client device, and/or sending a software patch to the first client device for at least one of storage and installation of the software patch on the first client device. The processor can also be configured to receive device information from the first client device, in response to the query to the first client device.

In some embodiments, a method includes automatically sending a query to a first client device associated with a user, and as a result receiving a first response, including user information for the user and first device information, from the first client device. Based on the first response and role information stored in a user role directory (such as an Active Directory database), a role of the user can be identified. The method also includes automatically sending a query to a second client device associated with the user, and as a result receiving a second response, including the user information and second device information, from the second client device. Each of the first device information and the second device information can include at least one of an indication of a software version, an indication of an operating system, an indication of an application running on the client device, an indication of a setting of the client device, or an indication of a software patch level. Based on the first device information, a security risk associated with the role of the user can be identified for the first client device. Based on the second device information, no security risk associated with the role of the user is identified for the second client device. A remedial action is selected based on the security risk and is implemented at the first client device but not at the second client device. The remedial action can include at least one of: (1) changing a setting of the first client device; (2) permitting remote control of the first client device; (3) preventing remote control of the first client device; (4) limiting remote control of the first client device; (5) disabling the first client device; or (6) sending a software patch to the first client device for at least one of storage and installation of the software patch on the first client device.

In some embodiments, a non-transitory processor-readable medium stores code representing instructions to be executed by a processor. The code includes code to cause the processor to automatically send a query to a client device and receive a response from the client device in response to the query. The response can include at least one of location information for the client device, identifying information for a current user of the client device, or device information for the client device. Alternatively or in addition, the response can include identifying information for the current user of the client device. The identifying information can include one or more of login credentials of the current user, an employee identifier number of the current user, or biometric data of the current user. The code also includes code to cause the processor to identify, based on the response and a user role directory (e.g., an Active Directory database) including a plurality of role indications of a user role, (1) a role of the current user of the client device, and (2) a security risk associated with the client device. Identifying the security policy can be based on a security risk level associated with the determined role of the current user. The code also includes code to cause the processor to identify a security policy associated with the role of the current user of the client device and the security risk. The code also includes code to cause the processor to identify a remedial action based on the security policy, and implement the remedial action.

In some embodiments, a method includes automatically sending a query to a first client device, and as a result of the query, receiving a response including first user information and first device information from the first client device. A role of a current user of the first client device can be identified based on the first user information and role information from a user role directory (e.g., an Active Directory database). A query is also automatically sent to a second client device, and as a result of the query, a response is received from the second client device. The response from the second client device can include second user information and second device information. The second device information is substantially similar to the first device information. Each of the first device information and the second device information can include at least one of an indication of a software version, an indication of an operating system, an indication of an application running on the client device, an indication of a setting of the client device, or an indication of a software patch level. Based on the second user information and the role information from the user role directory, a role of a current user of the second client device can be identified. The second role is different from the first role. A security risk associated with the current user of the first client device and the current user of the second client device is detected. A first remedial action is identified based on the security risk and the first role, and a second remedial action is identified based on the security risk and the second role. The second remedial action is different from the first remedial action. The first remedial action is implemented on the first client device and the second remedial action is implemented on the second client device.

In some embodiments, an apparatus includes a processor and a memory operatively coupled to the processor. The processor is configured to automatically send a query to a client device and receive, from the client device and in response to the query, a response. The response can include location information, for example, a global positioning system (GPS)-based location of the client device. Alternatively or in addition, the response can include device information for the client device. The device information includes at least one of an indication of a software version, an indication of an operating system, an indication of an application running on the client device, an indication of a setting of the client device, or an indication of a software patch level. A role of a current user of the client device is identified based on role information from an Active Directory database. Based on the response and the role of the current user of the client device, a security risk associated with the client device is identified. The processor is also configured to detect a security policy associated with the role of the current user of the client device and the security risk associated with the client device. The processor is also configured to identify a remedial action based on the security policy, and implement the remedial action. The remedial action can include at least one of: changing a setting of the client device, permitting remote control of the client device, preventing remote control of the client device, limiting remote control of the client device, disabling the client device, or sending a software patch to the client device for at least one of storage or installation of the software patch on the client device.

Various configurations of the systems and methods to automate networked device security response priority by user role detection are now described with reference to the figures, where like reference numbers may indicate identical or functionally similar elements. The configurations of the present systems and methods, as generally described and illustrated in the figures herein, could be arranged and designed in a wide variety of different configurations. Thus, the following more detailed description of several configurations, as represented in the figures, is not intended to limit the scope of the systems and methods, but is merely representative of the various configurations of the systems and methods.

FIG. 1A is a block diagram illustrating one configuration of a networked system 100 for automating security response priority by user role detection. The networked system 100 may include a plurality of electronic devices that are in electronic communication with one another. For example, the networked system 100 may include one or more networks (not shown in FIG. 1A), such as Local Area Networks (LANs), Wide Area Networks (WANs), Wireless Local Area Networks (WLANs), the Internet, etc. The networked system 100 may also include one or more computing devices (e.g., server 101 and/or client device 121).

In an implementation, and as shown in FIG. 1A, the networked system 100 may include a server 101 and one or more client devices 121. The server 101 may also be referred to as a management server, a core server or a core. The server 101 may communicate with the one or more client devices 121 via the one or more networks (not shown in FIG. 1A). In some implementations, the server 101 is located in a location that is remote from a client device 121. In an implementation, the server 101 may be a cloud-based server. For example, the server 101 may be accessible via an Internet connection. In other implementations, server 101 is physically located at the same location as one or more of the client devices 121. In an implementation, the server 101 may be a domain controller.

Examples of the client device 121 can include a desktop computer, a laptop computer, a tablet computer, a smartphone, a router, a printer, etc. In an implementation, the client device 121 is a mobile device (e.g., a laptop computer, a smartphone, a tablet computer, etc.) that is configured to join one or more different networks.

Computer security is important to protect the server 101, client devices 121, and the network to which the computing devices (i.e., the server 101 and the client device(s) 121) are connected. Computer security may also be referred to as "cyber security" or information technology (IT) security. Computer security includes controlling access to the hardware and software of a computing device. Computer security also includes protecting a network against harm that may come via vulnerabilities in network access, data and code (e.g., compromised software applications).

Computer security is becoming increasingly important as more and more computing devices are connected over one or more networks. For example, as society comes to rely on sophisticated computing systems and the Internet, computing devices may be exploited by malicious entities to compromise privileged information. This problem is especially important with the use of wireless networks (e.g., Bluetooth®, Wi-Fi®, cellular) and the growth of "smart" devices (e.g., smartphones, televisions and devices that are part of the Internet of Things).

One of the biggest issues with computer security is that security can be an over-solved problem. For example, an organization can lock out (e.g., restrict access to) all users, such that the users are unable to install software on their machine(s) and/or unable to access the Internet. This, however, may create many problems for day-to-day operation of a business.

Some approaches to address computer security include placing users in groups that are artificial and change with time. These approaches, however, present problems. For example, an organization may need to install software X on its client devices for a number of users. An administrator may assign the users to an installation group, and the software X may be installed on the client devices associated with those users. This static group, however, may get stale over time. If the user no longer needs software X or if new users need software X, then this installation group should be updated. Moreover, such assignments of users to installation groups may need to be replicated for each piece of software or each security measure. As such, this "static" approach can consume a great deal of institutional resources (e.g., maintenance by an administrator).

An alternative approach to the "static" approach is set forth herein and, in some embodiments, involves the implementation of automated user role determination mechanisms to classify a security response. The systems and methods described herein focus on user-oriented aspects of security, and viewing cyber security though this user-oriented "lens" is an additional way to view the end-user and the remediation of security issues.

Some software technologies exist to determine security gaps in a network or application environment. Such technologies typically focus on finding security gaps and eliminating them. Some such approaches prioritize their fixes according to user "groups," such as administrator groups. According to some embodiments of the present disclosure, prioritization of security-related remediation measures can be based, at least in part, by an individual's user role.

Some systems and methods described herein look not just at groups like "Administrators" on a network to determine the user security risk level, but actually determine each user's individual role to assess the overall impact of a security risk and to automate the response. As an example, a user role might be a "Power User" or "Developer," as determined by reference to one or more Active Directory groups and/or through role-tagging by a software application. Each role may have different responses to a security risk associated with that role, as may be determined by the risk intersecting with their role.

As an example, User A may be a manager of employees and, in that role, the nature of data to which User A has access may be more sensitive. In such a case, an indicator of system compromise (e.g., an indicator that a remotely-controlled service is starting) is detected. If User A has been identified as having a manager role, the server and/or client device can automatically remediate the risk (e.g., by disabling a resource). By contrast, if the same indicator of system compromise is detected for a member whose designated role is "developer," the implications of this indicator of system compromise are not as clear, and the system may instead prompt the user to indicate whether they intended the flagged activity (e.g., a remotely-controlled service starting), and if they indicate that they did not intend for the flagged activity to occur, the remediation may automatically commence. This role-based approach adds a dimension of risk evaluation at a user-oriented level, as opposed to a machine-based or a strict group-based level.

In an implementation, the server 101 includes a user role directory 103. The user role directory 103 may include a repository of indicators of different roles 105. Information about users (e.g., end-users) 107 may also be included in the user role directory 103 and associated with the different roles 105, thereby providing a mechanism for creating and/or defining user-based roles. For example, one or more users 107 can be associated with a role 105 of "administrator."

There can be different roles 105 based on the different groups that users are part of. For example, a user can be part of a "management" group, or the user can be part of an "engineering" group, or some other group that has a specific role in a company, enterprise or organization.

In some embodiments, the condition that a user is associated with multiple roles (e.g., 2 or 3 roles) can be associated with a security risk that is different from any security risk that is associated with each of the multiple roles individually. For example, for a user having a "developer"

role as his/her sole role, an associated security risk (determined/identified, for example, based on the role as well as a given client device being used, "D") may have a value of "4." Separately, for a user having an "executive" role as his/her sole role, an associated security risk (determined/identified, for example, based on the role and on client device D being used) may have a value of "6." Suppose now that a third user is assigned to two roles (or, a "compound" role): "developer" and "executive." In such a scenario, it may be determined (e.g., by an administrator and/or by the system itself) that the risk for such an individual should be higher (e.g., because he/she is a more likely target for a cyber attack). As such, an associated security risk (determined/identified, for example, based on the compound role and on client device D being used) may have a value of "9."

For each user 107 for which information is stored in the user role directory 103, there may be specific vulnerabilities from which, as end-users, they need protection. For example, a manager may not want to have somebody (e.g., an administrator) gain remote control access to the manager's client device without the manager knowing about the remote access or without giving approval. Therefore, based on the particular role 105, which may be defined for each individual, certain settings 113 may be applied to a server 101 or client device 121 based on that role 105. For example, for a certain role 105, remote control may be disabled, or a virus scan may be disabled, while the user 107 is using a client device 121 to give a presentation, etc.

The degree of the security impact may vary based on a user's role. For example, different policies 111 may be applied to enhance the security of a client device 121 or server 101 in such a way that the application of the policy 111 would not affect a user as much, or the application of the policy 111 would affect the user more depending on the role of the user. If a user does not have administrative access, that user may have a different set of settings 113 that apply to their client device or applications, as compared with a user that has administrative access.

In an implementation, the role 105 of a user 107 may be determined based on a group to which he/she is associated within the user role directory (e.g., their Active Directory (AD) group). A certain group of individuals in an Active Directory group may be designated as a certain role. For example, the users in an AD group may be designated "managers" for this particular company or part of the company. The users in a given role may have certain settings 113 applied to their associated devices (e.g., when they are logged into their associated devices). For example, the settings 113 for the managers may include rules associated with the installation of certain software, a setting that prohibits remote control, and/or a setting that prohibits power management.

The roles 105 in the user role directory 103 may be created and/or defined by administrators. For example, an administrator of the AD may create and/or define groups within the AD for the different roles. Creating and/or defining role-based groups facilitates the sorting and grouping of individuals based on their role 105. Some examples of roles 105 include an administrator role, a manager role, an engineering role, a human resources role, an executive staff role, etc. Individual users 107 may be associated with one or more roles 105. The administrators may have access to administrative rights to a domain. The administrators may have administrative rights to build and/or configure machines (such as client devices) that are used by a company's employees. Administrators may have control of the company assets, from the company's perspective. An engineer, however, may have comparatively limited access. The user role directory 103 can facilitate dynamic grouping, by virtue of its grouping function capabilities.

Each role 105 may have a security risk level 109 assigned to that role 105 (and, as shown in FIG. 1A, stored in the user role directory 103). For some roles, the security risk level 109 may be relatively high. Users 107 in certain roles 105 may not be trained as well on how protect their machines, or may have security-critical data. For such lesser-trained users, it may be desirable to have a stricter set of policies that can be applied. For example, if a user 107 is in an executive staff role, this user 107 may have access to financial documents or other high-security documents (e.g., stored on the server 101 and/or remotely accessible via the client device 121) that the user does not want others to see. In such a case, the executive staff role may have a high security risk level 109. The CEO's laptop may therefore be much more valuable than a similar laptop that is assigned to someone who does not have access to sensitive financial information.

For each role 105, certain policies can be applicable to that role based on the security risk level 109. A relevant policy 111 may include settings 113 that are applied to a client device 121 or server 101. These settings 113 may include whether to permit remote control, whether to permit ping requests, which software to install, whether to permit internet access, whether to permit network resource access, whether to permit access to local drives and/or an encryption level of local drives. It should be noted that these settings 113 have been provided as examples, and other settings 113 may be applied alternatively or in addition to the foregoing examples.

As an example, a group of engineers may go home at 5 pm every day. These users may be assigned an "engineer" role. A policy for the engineer role may include automatically shutting down the client devices of users having the engineer role at 6 pm, and turning those client devices back on at 7 am when those users begin work for the day. This procedure can be implemented, for example, as a power management and/or security measure. Certain sets of policies, settings, criteria, and/or states may be applied based on the role 105 to which a user 107 belongs. For a manager role, a different policy (from that of the engineer role) may be applied, for example because managers typically take their laptops home with them at the end of the day, and may continue working.

The role-based systems and methods set forth herein facilitate assessment and remediation of risk at a user-oriented level, as opposed to the machine-level or strict group-level. For example, if a user is assigned to an administrator group, or is part of a development group, or part of another particular group, separate associated security restrictions may be applied based on the identity of the user. That risk is evaluated, in some implementations, based on the configured policies.

Systems and methods disclosed herein may be implemented at the server 101, at the one or more client devices 121, or both. In some implementations, a client device 121 may include an agent 123. The agent 123 can provide granular control at the client device 121. The agent 123 may include a user role determination module 125. When a user logs into their client device 121, the user role determination module 125 may determine an identity of the user that is logging in, and/or his/her associated role. For example, the agent 123 can query the user role directory 103 of the server 101 (e.g., by sending a message encoding a query from the client device 121 and, in response, receiving a response message from the server 101, the response message encoding a user role) to determine the role 105 of the user 107.

Alternatively, the agent 123 can query a local database (e.g., a cache that stores last roles of the users that have logged into that client).

In an implementation, the agent 123 may perform an AD lookup to identify the role 105 of the login user 107. The agent 123 may send application programming interface (API) calls to the user role directory 103 (e.g., an AD) to identify the user role 105. As a result of the API calls, the agent 123 may receive an indication of the role(s) 105 to which a user 107 belongs. Therefore, the agent 123 can assess security risk levels.

The agent 123 may also include a policy application module 127. Upon determining the role 105 of the user 107, the policy application module 127 may apply the policy 111 associated with that role 105. The policy application module 127 may apply the one or more settings on the client device that are in the policy 111 associated with that role 105. For example, the agent 123 may configure remote control of the client device 121 to be enabled or disabled based on the policy 111. The agent 123 may disable remote control access or deny any requests to access remote control on the client device 121.

It should be noted that multiple users 107 can use the same client device 121 (e.g., at different times or at the same time, for example by one user remotely logging into a client device that another user is logged into), or a user 107 with different login credentials can use the same client device at different times. For such instances, the agent 123 may identify who is logged in, communicate with (e.g., query) the user role directory 103, obtain the associated user role information 105 and/or policy information 111, and then apply one or more policies 111 based on what the user 107 is permitted to do according to the policies 111. In some embodiments, the role information 105 can be downloaded to the client device 121 and then later (e.g., when the client is offline) a current user can perform all needed/permissible functions.

In some embodiments, two client devices 121 are substantially the same, but different remedial actions are implemented based on different roles 105 of current users 107 thereof. In other embodiments, a security risk 109 associated with the role 105 of a user 107 can be identified for a first client device 121 based on first device information, while no security risk 109 associated with the role 105 of the same user 107 is identified for a second client device 121 based on second device information, in which case a remedial action is selected and implemented at the first client device 121 but not at the second client device 121.

As an example, a user 107 may be a developer. The user 107, having an associated role 105, may log into their laptop and may have an associated security risk level 109 that is based on the associated role 105. In such a scenario, remote control and ping requests may be permitted. Ping requests can be dangerous because they let people know that a client device exists and can be targeted. To enhance security, ping requests may be disabled. As a developer, however, the user may want to respond to ping requests. The agent 123 can enable the appropriate settings 113 in the operating system (OS) or enable the ability to perform remote control after the user 107 logs in.

By contrast, if the CEO logs in at that same laptop, a different policy 111 may be applied. In this case, the agent 123 communicates with the user role directory, determines that the user 107 (the CEO, in this case) is part of the executive staff (i.e., the role is "executive"). The policy 111 in this case does not permit remote control and ping requests, and therefore the laptop may be locked down or the entire drive of the laptop may be encrypted. The agent 123 may apply these settings to the client device (e.g., automatically, for example upon detection of a login event).

After the agent 123 determines who is logged in, the agent 123 may perform an initial configuration using the settings 113 associated with the role 105 of the user 107. The agent 123 may then perform substantially continuous, sporadic and/or periodic monitoring to ensure that the client device 121 is in compliance with the policy of that user role 105. The agent 123 may include a report module 129. The agent 123 may report on the status of the client device 121 to show the administrators that are administering the machines on the network whether the client device 121 is in compliance with one or more associated policies 111.

As an example, the administrator may inspect a client device 121 on which a developer is logged in. In such a case, remote control is available and ping requests are available, however, since the developer may have source code stored in a directory on the client device 121, the agent 123 locks down the directory to external access. The report module 129 may send a status update to the server 101, for example, to indicate that the client device 121 has applied the aforementioned settings. If the CEO logs into the same client device 121, however, a change to a state/configuration of the client device may be applied. In the case of the CEO, the client device 121 may be "greenlighted" (e.g., access to some or all designated resources is permitted without restriction or with fewer restrictions) if remote control is off, ping requests are off and a particular directory is "locked down" (e.g., access to the particular directory by external devices is prohibited). Such monitoring ensures that the client device 121 is in compliance with the policies 111 that are set up for those different roles 105.

If a user 107 attempts to circumvent the policy settings 113, the agent 123 may report this behavior. In another implementation, the agent 123 may completely disable features to which a user 107 with a certain role 105 should not have access.

It should be noted that the settings 113 applied to the client device 121 may include network resources that are available to users with certain roles 105 but not users with other roles. For example, certain network resources may be accessible to users with some roles 105 and locked down (or inaccessible) to users with other roles 105. For example, there may be certain secret documents in a network directory that should be locked down (or made inaccessible) to users with certain roles 105.

In an implementation, the agent 123 may be preconfigured to pull down, download and/or retrieve settings 113 and policies 111 (e.g., automatically, for example upon detection of a login event). The agent 123 can be configured as desired by the administrator(s). For example, the agent 123 may obtain the settings 113 and policies 111 once an hour, once a day, once every two weeks, etc. The agent 123 may retrieve the settings 113 for each role 105. For a particular user role 105, the agent 123 may locally store information regarding which settings 113 apply to which roles. In such instances, the agent 123 need only determine the role(s) (e.g., of one or more detected users 107), and need not obtain more specific data about the user(s).

The server 101 may also include a user monitor 115. The user monitor 115 may include a user role determination module 117 and a policy application module 119. In some embodiments, on the server 101 side, the ability to ask for the request can be disabled. The server 101 may have complete (i.e., unrestricted) access to the user role directory 103.

In some embodiments, role-based security measures, as implemented by the methods for automating security response priority by user role detection set forth herein, are more comprehensive on the server 101 than on the client device 121 because the server 101 can manage multiple client devices, while on the client device 121, the agent 123 manages one or more client devices 121 (e.g., a cell phone of a user, or both a cell phone and a laptop of the same user). Whenever a user 107 is logged in, that user 107 is associated with a certain role 105. From the server side, the server 101 may be managing many client devices 121 and users 107. The server 101 has direct, local access to the AD database 103, whereas the agent 123 on the client device 121 may have access to specific portions of the AD database 103 that includes information related to a detected user 107.

In some embodiments, the server 101 can completely disable certain actions from being attempted on a client device 121 based on the role 105 of a particular user 107. For example, an administrator may decide, at a given point in time, that users in a development role do not need access to certain features. The administrator then sets the policy, and whenever one of the associated client devices 121 comes back up (i.e., comes back online and/or reconnects to a network), that client device 121 is automatically sent the new policy. In such a manner, the server 101 can perform management functions.

In some embodiments, the server 101 implements a role-based security mechanism by performing a method for automating security response priority by user role detection, as set forth herein. For certain roles 105 (e.g., an executive staff role), it may be beneficial to enable or disable settings 113 at the server 101. This may, for example, prevent an administrator at the server 101 from accessing security-sensitive data or from creating or defining other security risks.

As an example, the policy for an executive staff role may not allow remote control, even at the server 101. In this case, an administrator at the console of the server 101 cannot remote control a client device 121 of a user that is has an executive staff role.

In an implementation, the user monitor 115 of the server 101 may apply the settings 113 for users 107 according to their defined user roles 105. For example, an administrator of the server console may be browsing through a user role directory 103 (e.g., an AD). The administrator may click on the CEO's username. Remote control of a user's client device 121 may be accessible by right-clicking the username. The user monitor 115 may, however, disable this remote control feature. If the administrator right-clicks on the CEO's username or client device identifier, then the option to remote control is not available to the administrator, even though this individual has administrative privileges for the entire company. If, however, the administrator right-clicks on a developer's username, the option to remote control is available. It should be noted that, while the remote control was discussed as an example of one possible setting, other settings may be configured for the different user roles.

The user monitor 115 may perform actions that are similar to those of the agent 123, discussed above. The user role determination module 117 may determine the role 105 of users 107 in the user role directory 103. The policy application module 119 may apply the settings 113 associated with the different roles 105. Additionally, the policy application module 119 may configure the server 101 with appropriate settings so that an administrator would not have access to certain features that they would otherwise.

In some embodiments, software access and distribution may be based on user roles 105. For example, an organization may need to track software licenses, where only certain people should have access to software. The policy of a user role 105 may include access to software. For example, the policy of one role 105 may not allow software to be pushed out to users 107 assigned to that role 105, or may prevent those users 107 from installing the software. The policy for another role 105 may, however, allow access to the software. When a user 107 assigned to that role 105 logs into their client device 121, the software may be installed (e.g., automatically) and/or the user 107 may have access to that software.

In some embodiments, access to the internet or other network resources may be based on user roles 105. An organization may want to allow internet access to certain types of users 107 while blocking other types of users 107. For example, in the case of a hospital, the hospital administrators may need to access internet sites that they would normally use in their day-to-day business of running the hospital, but nurses at a nursing station may use access to the medical directory on a site that is medically related. In this example, the users 107 in the hospital administrator role may be associated with a policy 111 that allows internet access while users 107 in the nursing role would have restricted internet access. When these users 107 log into their client device(s) 121, the agent 123 may apply the settings 111 according to their role 105, for example to provide or to restrict access to the internet.

In some embodiments, a user 107 may have multiple roles 105 within the user role directory 103. For example, a user 107 may be assigned to an engineering role, but is also a manager. With a static group approach, an administrator would have to move that user in and out of those groups, which is cumbersome. The role-based mechanisms described herein are dynamic. For example, by changing a single bit of an identifier of a user's role within the user role directory 103, that user 107 can be "moved" from role to role inside the user role directory 103.

In some embodiments, if a user 107 has multiple roles 105 associated with him/her, a conflict resolution mechanism may be used to identify and apply the policy 111 (from among a plurality of policies 111, each associated with one of the multiple roles) having the highest (i.e., "overarching") security risk level. The agent 123 or the user monitor 115 can base the policy 111 on the overarching risk factor. The identified policy can then be applied to the role 105 with the higher associated security risk level. Alternatively, as discussed above, a new "compound" role can be generated (e.g., by the server 101 and/or the client device 121) when multiple roles are associated with a single user, such that an altogether different security risk level (e.g., a higher security risk level) is defined for the compound role, as compared with the security risk levels associated with the roles individually.

Systems and methods described herein improve upon known approaches to computer security. Instead of using static groups that are artificial and that change with time, the role-based approaches set forth herein use role determination mechanisms to identify a security policy and to apply appropriate settings for a given user.

In some embodiments, a server (e.g., server 101 of FIG. 1A) can automatically and/or proactively send a query to a networked client/user device (e.g., client device 121 of FIG. 1A), and receive a response from the client device as a result of the query. In such implementations, the query can be sent automatically, rather than in response to a communication received from the client device or in response to an input made manually by an administrator. The query can include, for example, a ping or request for a location of the client device (e.g., a GPS-determined location), an identifier of the current user (e.g., for use in a subsequent AD lookup), a configuration (e.g., a hardware configuration or a software configuration) of the client device, an indication of software on the client device, an indication of an operating system (OS) version, or a request for an AD lookup (e.g., to determine a role of the user presently logged-in on the client device). Based on the response received at the server from the client device (e.g., based at least in part on the role of the user presently logged-in on the client device, user information/identifiers, and/or device information), the system can identify one or more security risks and/or one or more security policies that are applicable to the client device. The system can then proactively and automatically send a signal to the client device to implement (e.g., "push") one or more remedial actions at the client device to address the identified security risk(s) and/or to ensure compliance with the identified one or more security policies. Remedial actions can include, by way of example, permitting remote control of the client device, preventing or limiting remote control of the client device, locking down the client device such that the client device cannot be used by a user, sending a software patch to the client device for storage and/or installation thereon, modifying one or more settings of the client device, etc.

In some implementations, a single user has a single role and multiple client devices associated with him/her, and the relevant security risks, security policies and/or remedial actions can vary (e.g., according to which client device is being queried). In other implementations, a single user has multiple roles, either simultaneously or sequentially over time, and the relevant security risks, security policies and/or remedial actions can vary (e.g., based on a current role associated with a given user and device at the time of the query). As such, the system can dynamically make security-related decisions (e.g., determination of security risk level, determination of applicable security policy, and/or determination of appropriate remedial action(s)), for example temporally or on a device-by-device and/or a user-by-user basis.

Each of the "modules" shown and described with reference to FIG. 1A (i.e., user role determination module 117, policy application module 119, user role determination module 125, policy application module 127, and report module 129) can comprise hardware or software that is stored on and/or executed by hardware. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™ and/or other object-oriented, procedural, or other programming language and development tools.

Figure 1B:
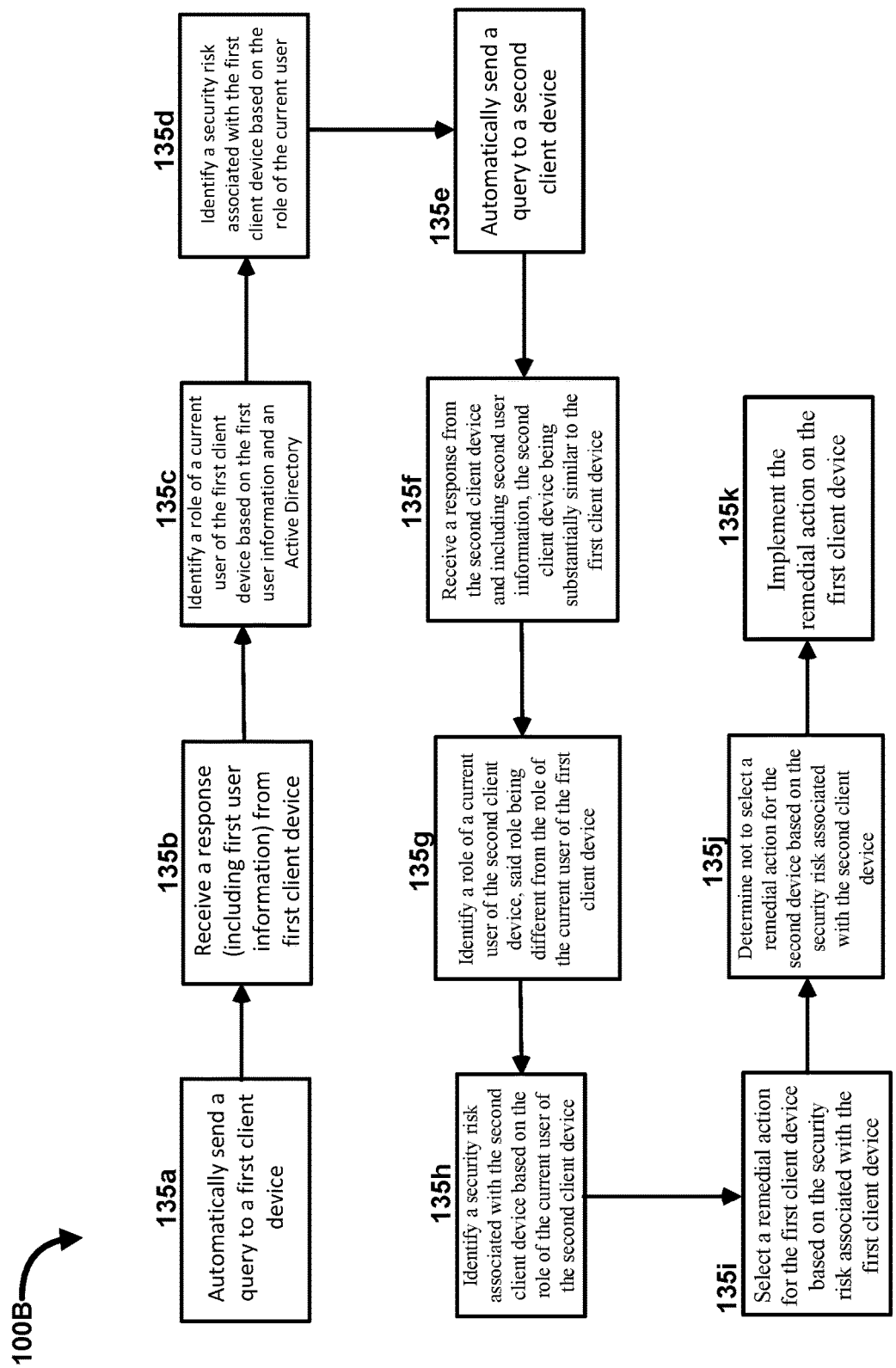
FIG. 1B is a process flow diagram illustrating a method for automating security response priority by user role detection, according to another embodiment.

FIG. 1B is a process flow diagram illustrating a method for automating security response priority by user role detection, according to another embodiment. As discussed above, an apparatus of the present disclosure can include a processor and a memory operatively coupled to the processor, where the processor is configured to perform steps (e.g., by reference to instructions stored in the memory). An example sequencing of such steps is shown via the method 100B of FIG. 1B. As shown in FIG. 1B, at 135*a*, the processor automatically sends a query to a first client device, and at 135*b* receives, from the first client device and in response to the query to the first client device, a response including first user information. Based on the first user information and role information stored in an Active Directory database, the processor identifies (at 135*c*) a role of a current user of the first client device. Based on the identified role of the current user of the first client device, the processor identifies a security risk associated with the first client device (135*d*). The processor then automatically sends, at 135*e*, a query to a second client device, and receives (at 135*f*), from the second client device and in response to the query to the second client device, a response including second user information. In some such implementations, the second client device is identical to or substantially similar to the first client device (e.g., same device model, same device make, same device operating system, etc.). At 135*g*, the processor identifies a role of a current user of the second client device based on the second user information and the role information stored in the Active Directory database. The role of the current user of the second client device, for purposes of FIG. 1B, is different from the role of the current user of the first client device At 135*h*, the processor identifies, based on the role of the current user of the second client device, a security risk associated with the second client device. Based on the security risk associated with the first client device identified at 135*h*, the processor selects a remedial action for the first client device, and, at 135*j*, determines not to select a remedial action for the second device based on the security risk associated with the second client device. The processor then sends a signal to the first client device to cause implementation of the selected remedial action on the first client device (135*k*).

Figure 2:
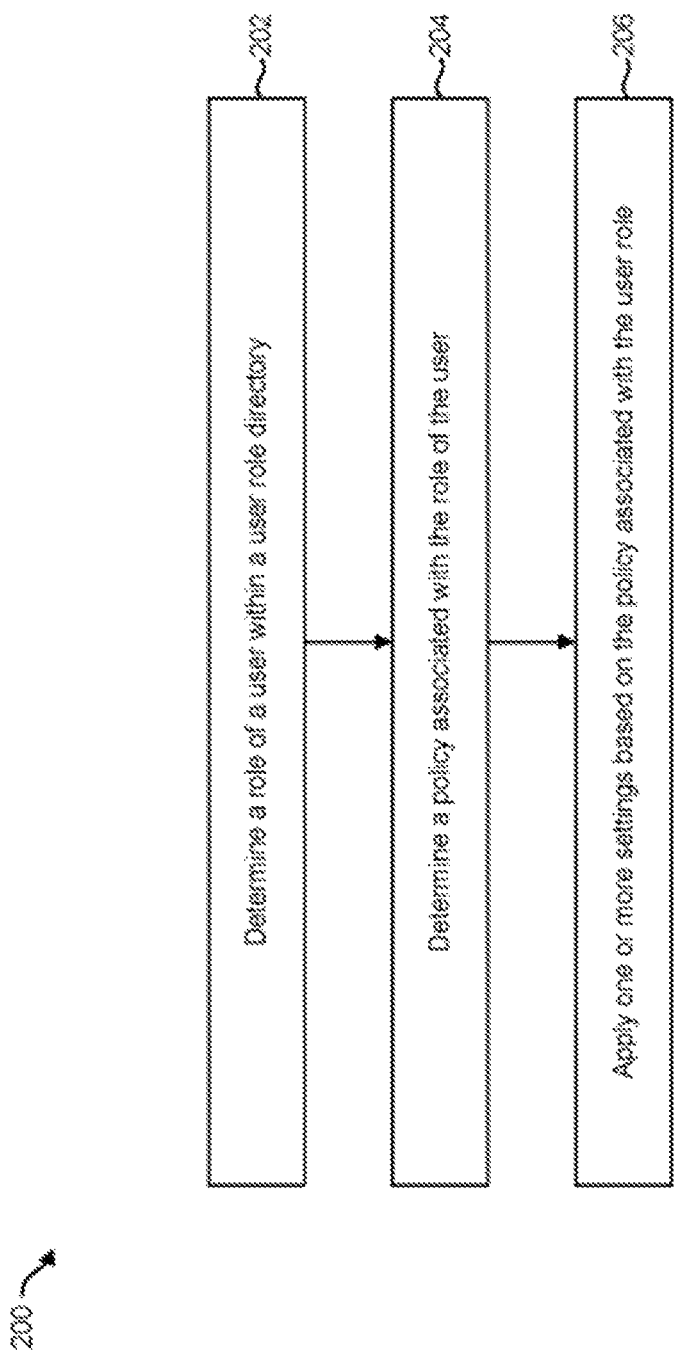
FIG. 2 is a flow diagram illustrating a method for automating security response priority by user role detection, according to another embodiment.

FIG. 2 is a flow diagram illustrating a method for automating security response prioritization based on user role detection. The method 200 is compatible with and performable by the networked system 100 of FIG. 1A, and may be implemented by a computing device such as a server or a client device (e.g., server 101 or client device 121 shown in FIG. 1A). As shown in FIG. 2, at 202, the computing device may determine a role of a user within a user role directory. For example, a client device may receive login credentials when a user logs into the client device. The server may include the user role directory. The user role directory may include indications of different roles. Users may be associated with the different roles within the user role directory. In an implementation, the user role directory may be an Active Directory. The computing device may perform an Active Directory lookup of the user to determine with which role the user is associated. At 204, the computing device determines a policy associated with the role of the user. A role can have a certain associated policy that applies for a given security risk level. The policy may include settings that are applied to a client device or server. At 206, the computing device may apply one or more settings based on the policy associated with the user role. For example, the policy for a given user role may prohibit/block remote control. In such a case, the computing device may disable remote control functionality.

In some embodiments, the computing device is a server, while in other embodiments the computing device is the client device itself. The server can automatically (i.e., without being triggered or externally/manually instructed to do so) send a query to a client device, requesting login credentials of a presently-logged-in user. The server can receive the login credentials in a response that is returned to the computing device by the client device. Based on the received login credentials, the computing device can determine a user role, an associated security risk, and an associated security policy. The determinations of the associated security risk and/or security policy can be based on the user role and, optionally, also based on one or more of the following: client device type, client device model, client device operating system version, client device patch level, software type, software version, client device location, client device location history, application running on the client device, setting(s) of the client device, vulnerability of the client device (e.g., to a predetermined cyber-threat), the type of network to which the client is connected, and/or the like. Based on the security policy (and, optionally, at least one further parameter, such as a client device type, client device model, client device operating system version, client device patch level, software type, software version, client device location, client device location history, application running on the client device, setting(s) of the client device, vulnerability of the client device, and/or the like), the computing device can determine and/or identify, and proactively and automatically implement (i.e., "push"), one or more remedial actions by sending a signal to the client device to instruct the client device to implement the one or more remedial actions, for example to address the identified security risk(s) and/or to ensure compliance with the identified one or more security policies.

In an example implementation, a server automatically sends a query to a client device, requesting location information for the client device (e.g., GPS-determined location information). The server can receive the location information from the client device via a response that is sent to the computing device by the client device. The response can also include user information. The server can then use the received location information, together with the user information, to determine (1) a security risk associated with the user role; and (2) a security policy associated with the user role. As discussed above, the determination of the associated security risk and/or security policy can be based on a combination of the determined user role and an indicator of one or more of the following (each of which can be obtained in a response to a query sent from the server to the client device): client device type, client device model, client device operating system version, client device patch level, software type, software version, client device location, client device location history, application running on the client device, setting(s) of the client device, vulnerability of the client device, and/or the like. The server can then select/identify at least one remedial action to address the determined security risk and/or to ensure compliance with the determined security policy. The server can then proactively implement the determined at least one remedial action by sending a signal to the client device to implement the selected remedial action.

In another example implementation, a server automatically sends a query to a client device requesting identifying information for a current user of the client device (e.g., login credentials, user role, employee identifier number, biometric data of the user, etc.). The server can receive the user-identifying information from the client device via a response that is sent to the computing device by the client device. The server can then use the received user-identifying information to determine: (1) a user role; (2) a security risk associated with the user role; and (3) a security policy associated with the user role. As discussed above, the determination of the associated security risk and/or security policy can be based on a combination of the determined user role and an indicator of one or more of the following: client device type, client device model, client device operating system version, client device patch level, software type, software version, client device location, client device location history, application running on the client device, setting(s) of the client device, vulnerability of the client device, and/or the like. The server can then determine at least one remedial action to address the determined security risk and/or to ensure compliance with the determined security policy. The server can then proactively implement the determined at least one remedial action by sending a signal to the client device to implement the selected remedial action.

In yet another example implementation, a server automatically sends a query to a client device requesting (1) identifying information for a current user of the client device (e.g., login credentials, user role, employee identifier number, biometric data of the user, etc.), and (2) device information (e.g., indicators of software version, operating system, running application(s), setting(s) of the client device, software patch level, etc.) for the client device. The server can receive the user-identifying information and device information from the client device via a response that is sent to the computing device by the client device. The device information can include identifiers associated with one or more of the following: client device type, client device model, client device operating system version, client device patch level, software type, software version, client device location, client device location history, application running on the client device, setting(s) of the client device, vulnerability of the client device, and/or the like. Alternatively or in addition, the device information can include a device identifier that can be used by the server to retrieve associated device data from a local storage repository. The server can then use the received user-identifying information to determine a user role, and can use both the user role and the device information to determine: (1) a security risk associated with the user role; and (2) a security policy associated with the user role. As discussed above, the determination of the associated security risk and/or security policy can be based on a combination of the determined user role and the device information. The server can then determine at least one remedial action to address the determined security risk and/or to ensure compliance with the determined security policy. The server can then proactively implement the determined at least one remedial action by sending a signal to the client device instructing the implementation of the selected remedial action.

In some embodiments, the server automatically sends queries to one or more client devices iteratively and/or repeatedly over time, for example according to a predetermined schedule, after predetermined intervals of time, and/or in response to one or more triggering events. Examples of triggering events can include, for example, the detection of a location of the client device (e.g., the location being outside a predefined geographic region), the detection of a new cyber-threat or system vulnerability, the receipt of a notification that a new software patch is available, the receipt of a notification that a user's role has changed, the receipt of a notification that a user no longer has a role, the receipt of a notification that a security breach has occurred, detection of anomalous user behavior (e.g., the detection of usage behavior that deviates from a known trusted usage pattern, or the detection of the login of a different user), and/or the like.

Figure 3:
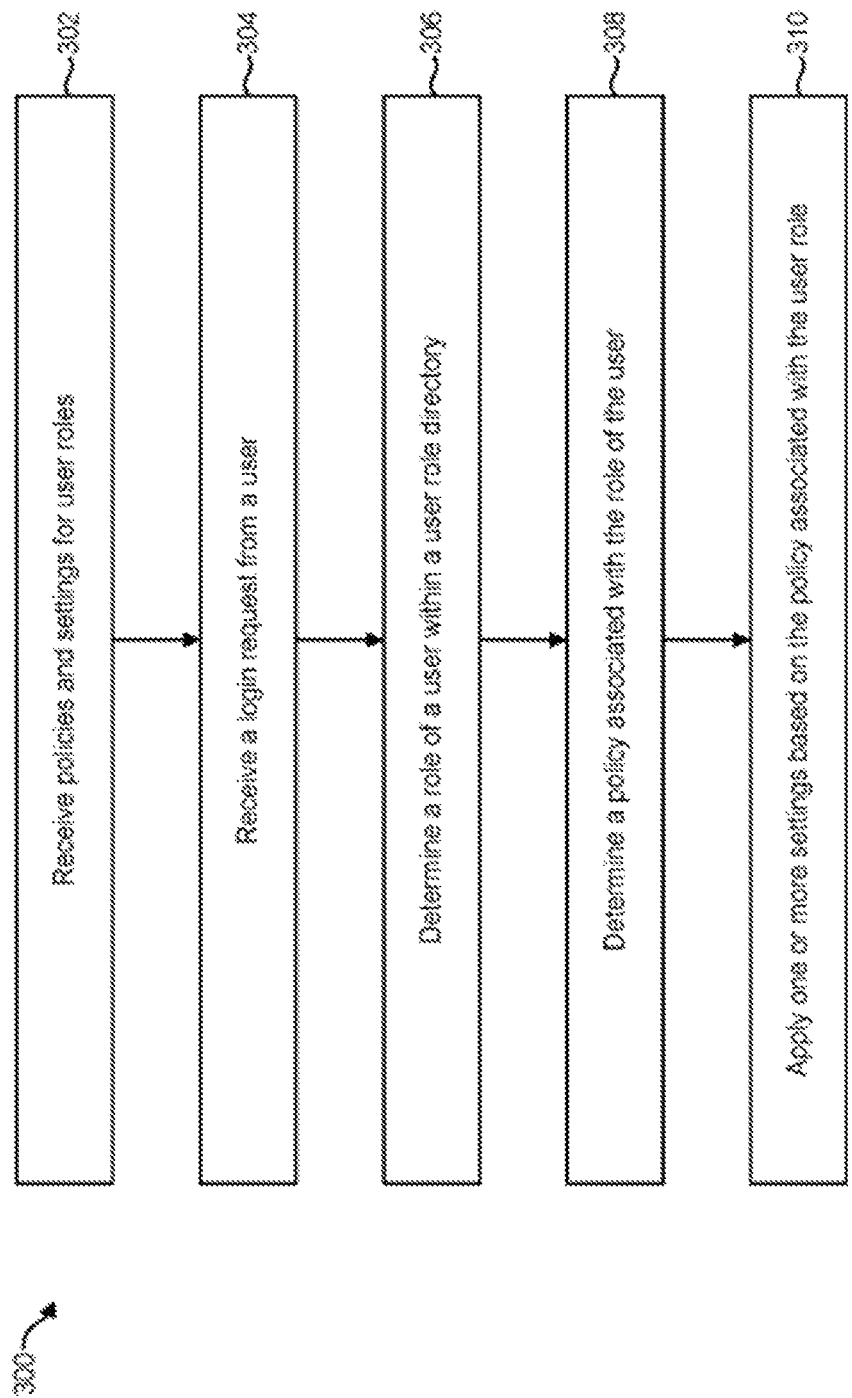
FIG. 3 is a flow diagram illustrating a method for automating security response priority by user role detection, according to another embodiment.

FIG. 3 is a flow diagram illustrating a method for automating security response priority by user role detection, according to another embodiment. The method 300, compatible with and performable by the networked system 100 of FIG. 1A, may be implemented by a client device (e.g., server 101 or client device 121 shown in FIG. 1A). The client device may be configured to communicate with a server via a network. As shown in FIG. 3, the client device may receive policies and settings for user roles, at 302. For example, the agent may be preconfigured to pull down (e.g., retrieve, access or download) or receive settings and policies (e.g., from a local memory, from the server via one or more queries, and/or by communicating with a remote host). The agent may obtain the settings and policies according to a predetermined schedule (e.g., once an hour, once a day, once every two weeks, etc.). The agent may pull down (e.g., retrieve, access or download) the settings for one or more roles (e.g., from a local memory, from the server via one or more queries, and/or by communicating with a remote host). At 304, the client device receives a login request from a user (or, alternatively, detects a login event associated with a user). For example, a user may log into a laptop device. The login request may include user credentials that may be used to identify a given user (e.g., based on a user identifier). At 306, the client device determines a role of a user within a user role directory. For example, the client device may send a user role determination request to the server. In an implementation, the user role directory may be an Active Directory. The server may perform an Active Directory lookup of the user based on the user information to determine with which role the user is associated. The server may identify one or more roles for the given user and send this role information back to the client device. At 308, the client device determines a policy associated with the role of the user (however, in other embodiments, the determination of the policy associated with the role of the user is performed at the server). For example, the client device may select the policy that matches the role of the user as indicated by the server. At 310, the client device applies one or more settings based on the policy associated with the user role. The policy associated with the user's role may include one or more settings that should be applied on the client device. The client device may apply these settings automatically.

Figure 4:
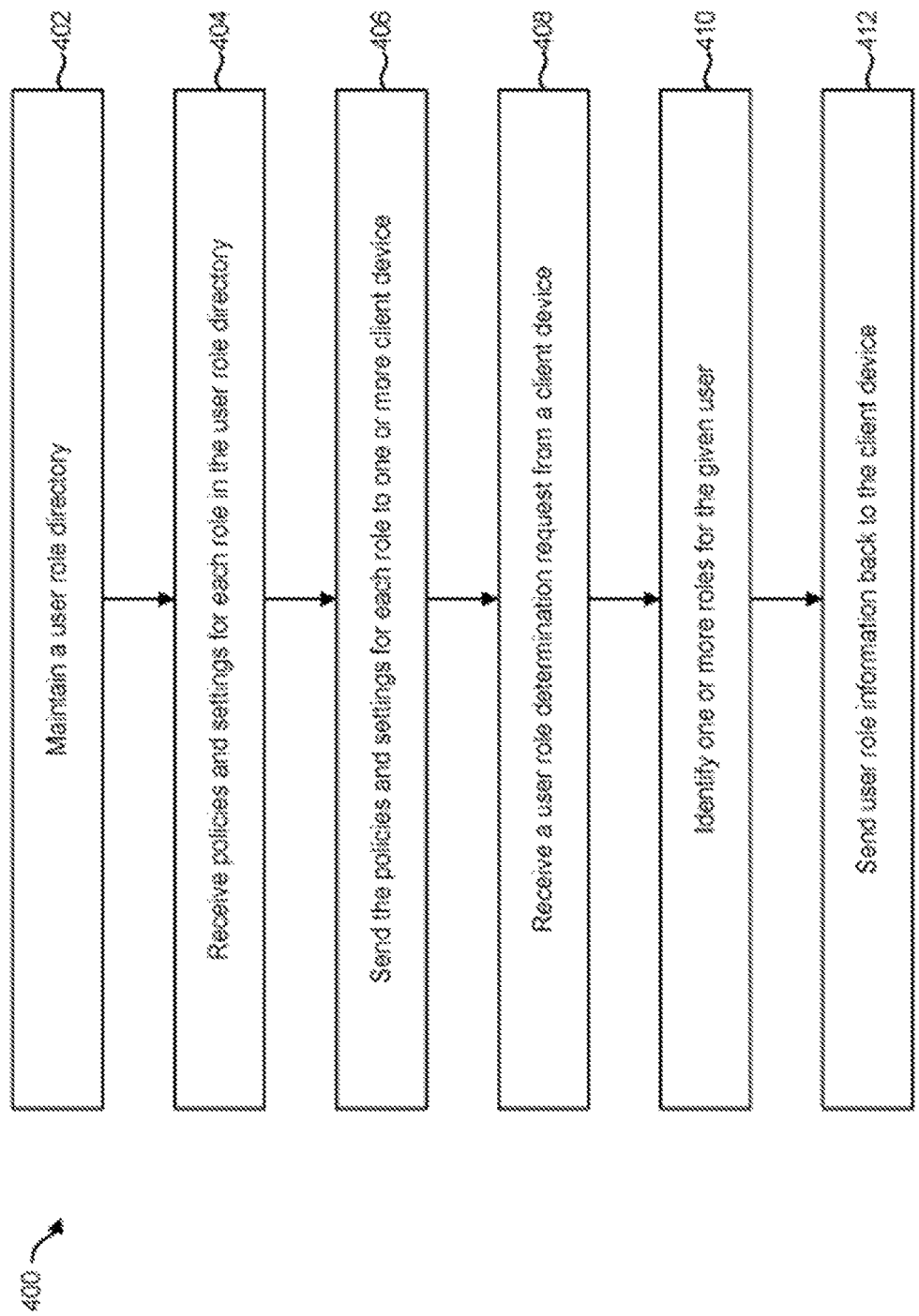
FIG. 4 is a flow diagram illustrating a method for automating security response priority by user role detection, according to another embodiment.

FIG. 4 is a flow diagram illustrating a method for automating security response priority by user role detection, according to another embodiment. The method 400, compatible with and performable by the networked system 100 of FIG. 1A, may be implemented by a server. The server may be configured to communicate with one or more client devices via a network. As shown in FIG. 4, at 402, the server maintains a user role directory (similar to the user role directory 103 of FIG. 1). The user role directory may include indications of different roles. Users may be associated with the different roles based on a correspondence, within the user role directory, between identifiers of the users and identifiers of the roles. In an implementation, user role directory may be an Active Directory. An administrator may assign a user to one or more roles within the user role directory. At 404, the server receives policies and settings for each role in the user role directory. Each role may be defined as being associated with one or more security risk levels, depending upon the device information. Each role may also be defined as being associated with different remedial actions for each security risk level. At 406, the server sends the policies and settings for each role to one or more client device. The client device may receive policies and settings for user roles. For example, the agent may be preconfigured to pull down or receive settings and policies. The agent may obtain the settings and policies according to a schedule (e.g., once an hour, once a day, once every two weeks, etc.). The agent may identify/retrieve the settings for one or more roles. At 408, the server receives a user role determination request from a client device. In an implementation, the user role directory may be an Active Directory. The server may perform a lookup in the user role directory to determine with which role the user is associated. The server identifies one or more roles for the given user, at 410, and sends the identified role information back to the client device, at 412. In response to receiving the role information, the client device can apply the appropriate policy and/or implement the appropriate remedial measure.

Figure 5:
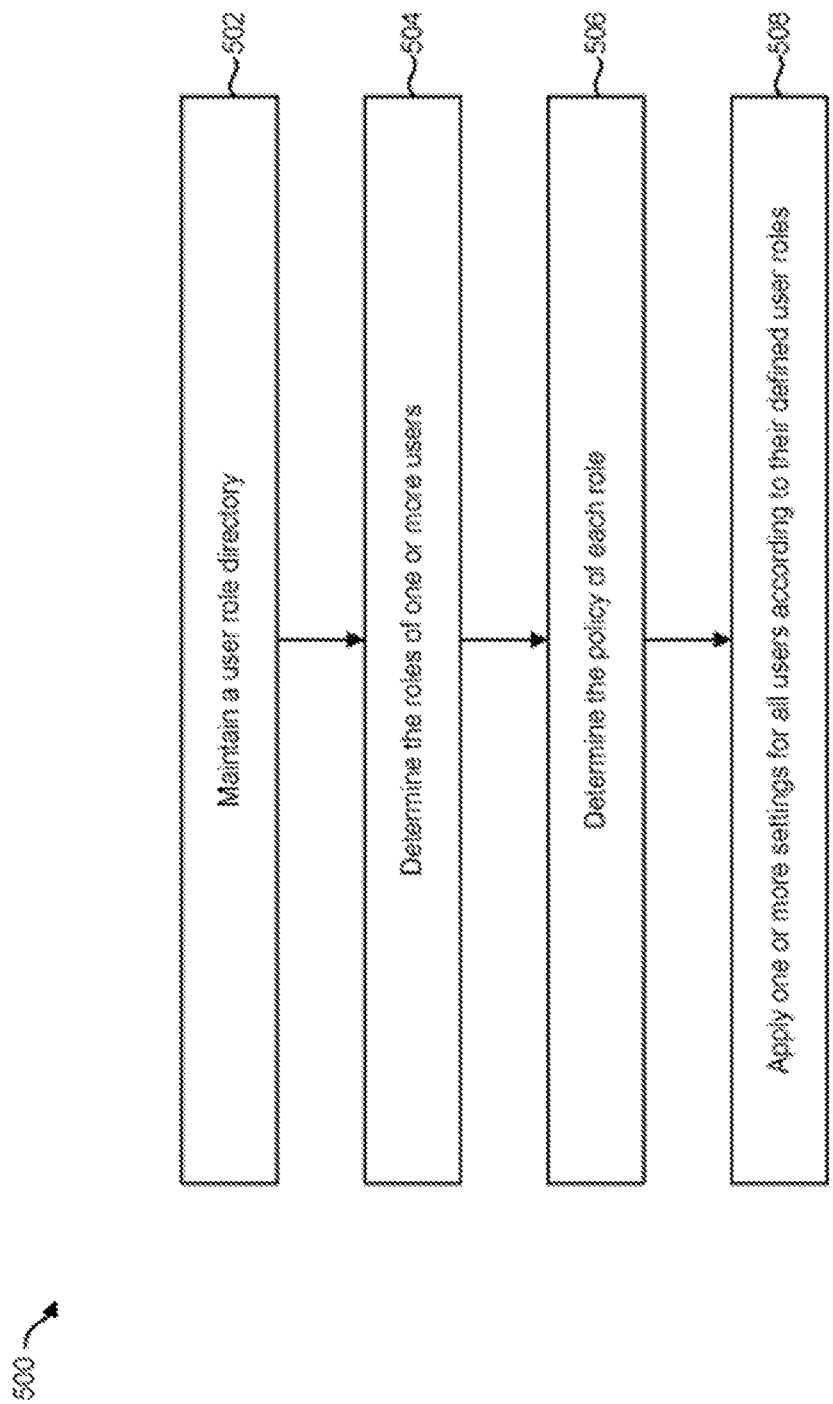
FIG. 5 is a flow diagram illustrating a method for automating security response priority by user role detection, according to another embodiment.

FIG. 5 is a flow diagram illustrating a method for automating security response priority by user role detection, according to another embodiment. The method 500, compatible with and performable by the networked system 100 of FIG. 1A, may be implemented by a server. As shown in FIG. 5, the server may maintain a user role directory, at 502. The user role directory may include indications of different roles. Users may be associated with the different roles based on a correspondence, within the user role directory, between identifiers of the users and identifiers of the roles. In an implementation, user role directory is an Active Directory. An administrator may assign a user to one or more roles within the user role directory. Each role may have a security risk level. At 504, the server determines the roles of one or more users. For example, the server may determine the role of each user in the user role directory. At 506, the server determines the policy of each role. A given policy may have one or more settings to implement a security response according to the security risk level of the given role. In an example, the policy for an executive staff role may not allow remote control at the server. In this case, an administrator at the console of the server cannot remote control a client device of a user that is in the executive staff role. At 508, the server applies the one or more settings for users according to their defined user roles. For certain roles (e.g., executive staff role), it may be beneficial to enable or disable settings at the server. This may prevent an administrator at the server from accessing security-sensitive data or from creating and/or defining other security risks, for example. The server may configure appropriate settings so that an administrator does not have access to certain features to which they otherwise would have access.

Figure 6:
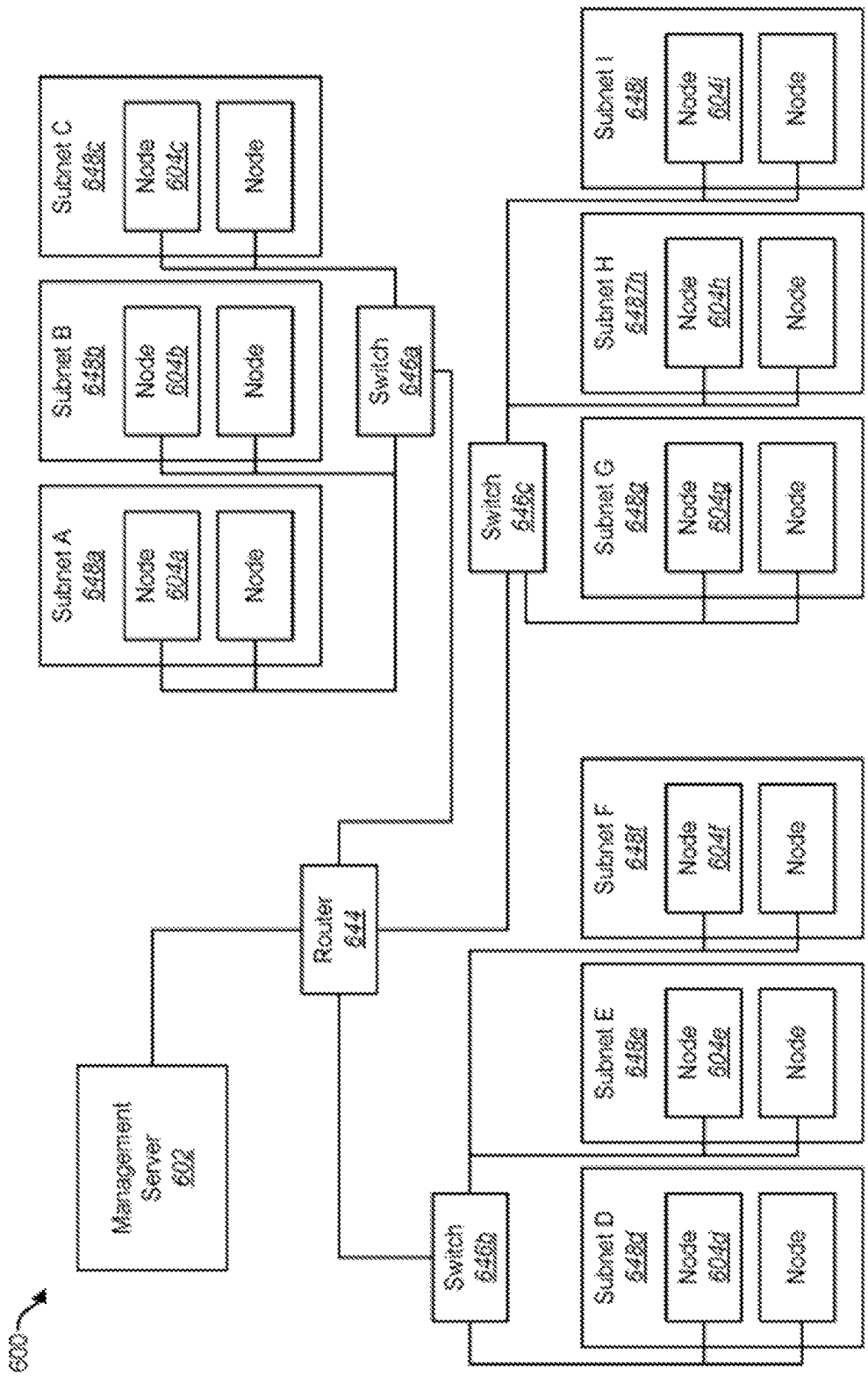
FIG. 6 is a block diagram of a network configuration implementing systems and methods for automated security response priority by user role detection, according to another embodiment.

FIG. 6 is a block diagram of a network 600 in which the systems and methods for automated security response priority by user role detection set forth herein may be implemented. As shown in FIG. 6, a management server 602 is connected to a router 644. The router 644 is connected to switches 646a, 646b, and 646c. The switch 646a is connected to several nodes 604a, 604b, 604c, etc., via their respective subnets 648a, 648b, and 648c. The switch 646b is connected to several nodes 604d, 604e, 604f, etc., via their respective subnets 648d, 648e, and 648f. The switch 646c is connected to several nodes 604g, 604h, and 604i, etc., via their respective subnets 648g, 648h and 648i.

Although FIG. 6 only shows one router 644, and a limited number of switches 646, subnets 648 and nodes 604, many and varied numbers of routers 644, switches 646, subnets 648 and nodes 604 may be included in networks and/or systems that may implement systems and methods for context-based privilege mitigation.

It should be noted that the management server 602 may be implemented in accordance with the server 101 shown and described in connection with FIG. 1. Furthermore, the nodes 604 may be examples of one or more of the client devices (or "computing devices") 121 shown and described in connection with FIG. 1.

Figure 7:
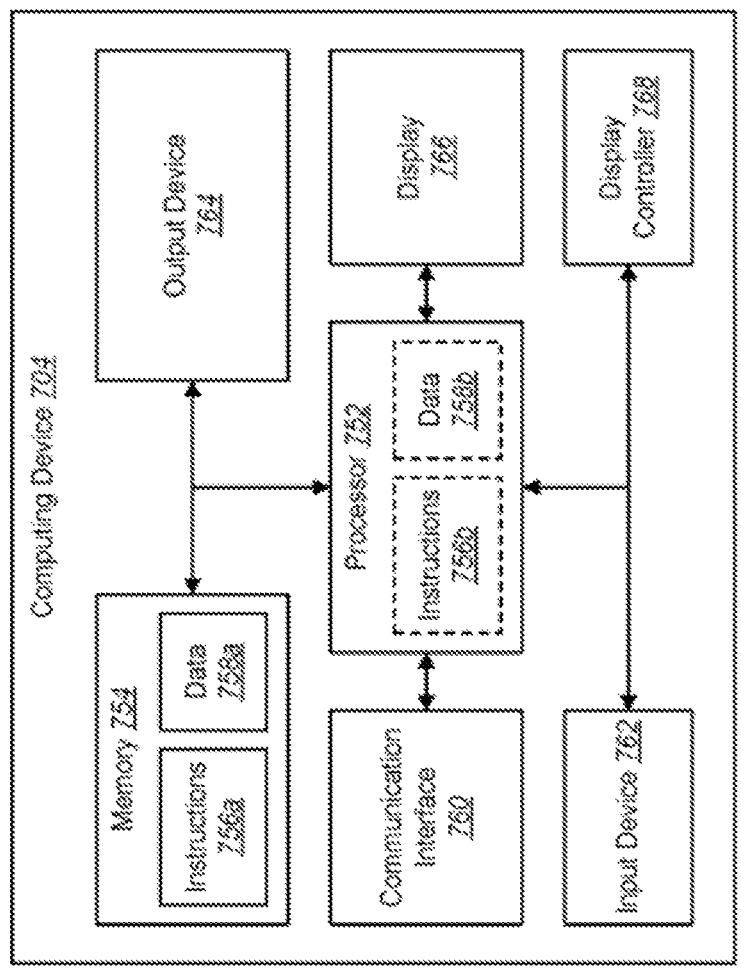
FIG. 7 illustrates a computing device for automating security response priority by user role detection, according to another embodiment.

FIG. 7 illustrates a computing system 700 including a computing device 704, with operable coupling between components indicated as arrows. The computing device 704 may be configured in accordance with one or more of the servers 101 or client devices 121 as shown and described in connection with FIG. 1A. The computing device 704 may include a processor 752 and memory 754. The memory 754 may include program instructions 756a and data 758a. The processor 752 controls the operation of the computing device 704 and may be, for example, a microprocessor, a microcontroller, a digital signal processor (DSP) or other device known in the art. The processor 752 typically performs logical and arithmetic operations based on program instructions 756b and/or data 758b received from the memory 754.

The computing device 704 includes one or more communication interfaces 760 for communicating with other electronic devices. The communication interfaces 760 may be based on wired communication technology, wireless communication technology, or both. Examples of different types of communication interfaces 760 include a serial port, a parallel port, a Universal Serial Bus (USB), an Ethernet adapter, an IEEE bus interface, a small computer system interface (SCSI) bus interface, an infrared (IR) communication port, a Bluetooth® wireless communication adapter and so forth.

The computing device 704 includes one or more input devices 762 and one or more output devices 764. Examples of different kinds of input devices 762 include a keyboard, a mouse, a microphone, a remote control device, a button, a joystick, a trackball, a touchpad, a lightpen, etc. Examples of different kinds of output devices 764 include a speaker, a printer, etc. One specific type of output device that may be included in a computer system 700 (instead of or in addition to output device 764) is a display device 766. Display devices 766 used with configurations disclosed herein may utilize any suitable image projection technology, such as liquid crystal display (LCD), light-emitting diode (LED), gas plasma, electroluminescence, a cathode ray tube (CRT) or the like.

A display controller 768 may also be provided, for converting data stored in the memory 754 into text, graphics and/or moving images (as appropriate) shown on the display device 766. FIG. 7 illustrates one possible configuration of a computing device 704, however other architectures and components may be used in conjunction with the methods and systems set forth herein.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. An apparatus, comprising:
a processor; and
a memory operatively coupled to the processor, the processor configured to:
  automatically send a query to a first client device;
  receive, from the first client device and in response to the query to the first client device, a response including first user information associated with a current user of the first client device, the current user of the first client device being a first user;
  identify, based on the first user information and role information stored in an Active Directory database, a first role of multiple roles associated with the first user, the multiple roles including a second role that is also assigned to the first user;
  identify, based on the first role of the first user, a first security risk associated with the first user;
  further identify, based on the second role of the first user, a second security risk associated with the first user;
  associate a third security risk with the first client device while the first user is using the first client device, the third security risk being greater than the first security risk and the second security risk and being based on the first user having the multiple roles;
  automatically send a query to a second client device;
  receive, from the second client device and in response to the query to the second client device, a response including second user information associated with a current user of the second client device, the second client device being substantially similar to the first client device;
  identify, based on the second user information and the role information stored in the Active Directory database, a role of the current user of the second client device, the role of the current user of the second client device being different from the first role and the second role of the first user of the first client device;
  identify, based on the role of the current user of the second client device, a fourth security risk associated with the second client device while the current user of the second client device is using the second client device;
  select a remedial action for the first client device based on the third security risk, the remedial action configured for implementation while the first user of the first client device is using the first client device to mitigate the third security risk associated with the first client device;
  determine not to select a remedial action for the second client device based on the fourth security risk associated with the second client device; and
  implement the remedial action on the first client device while the first user of the first client device is using the first client device.

2. The apparatus of claim 1, wherein:
the processor further configured to receive, from the first client device and in response to the query to the first client device, device information; and the identifying the first security risk is further based on the device information.

3. The apparatus of claim 2, wherein the device information includes at least one of an indication of a software version, an indication of an operating system, an indication of an application running on the first client device, an indication of a setting of the first client device, or an indication of a software patch level.

4. The apparatus of claim 1, wherein the third security risk includes:
   a device setting of the first client device that introduces a vulnerability to the first client device while the first user uses the first client device;
   a remote control setting of the first client device while the first user uses the first client device;
   an operational state of the first client device while the first user uses the first client device; or
   an accessibility setting of a file, a directory, or a network resource while the first user uses the first client device.

5. The apparatus of claim 1, wherein the remedial action includes:
   restricting or preventing access to a file, a directory, or a network resource while the first user uses the first client device;
   permitting remote control of the first client device while the first user uses the first client device;
   preventing remote control of the first client device while the first user uses the first client device;
   limiting remote control of the first client device while the first user uses the first client device; or
   disabling the first client device.

6. The apparatus of claim 1, wherein the processor is further configured to:
   automatically send a query to a third client device;
   receive, from the third client device, a response including third user information of a third user that is a current user of the third client device;
   identify, based on the third user information and the role information stored in the Active Directory database, a role of the third user; and
   identify, for the third client device, no security risk associated with the role of the third user while the third user is using the third client device.

7. The apparatus of claim 1, wherein the query is automatically sent according to a predetermined schedule.

8. A non-transitory processor-readable medium storing code representing instructions to be executed by a processor, the code comprising code to cause the processor to:
   automatically send a query to a client device;
   receive, from the client device and in response to the query, a response including first user information associated with a current user of the client device;
   identify, based on the response and a user role directory including a plurality of role indications of user role, a first role and a second role associated with the current user of the client device;
   identify a first security risk associated with the client device while the current user of the client device is using the client device based on the first role;
   identify a second security risk associated with the client device while the current user of the client device is using the client device based on the second role;
   identify a security policy associated with the first role and a second role of the current user of the client device and the first and second security risks, the security policy associating a third security risk with the current user, the third security risk being greater than the first security risk and the second security risk and being based on the first role and the second role;
   identify a remedial action based on the security policy, the remedial action configured for implementation while the current user of the client device is using the client device to mitigate the third security risk associated with the client device; and
   implement the remedial action while the current user of the client device is using the client device.

9. The non-transitory processor-readable medium of claim 8, wherein the user role directory includes an Active Directory database.

10. The non-transitory processor-readable medium of claim 8, wherein the identifying the security policy is based on a security risk level associated with the first role and a second role of the current user.

11. The non-transitory processor-readable medium of claim 8, wherein the response further includes at least one of:
    location information for the client device, or
    device information for the client device.

12. The non-transitory processor-readable medium of claim 8, wherein the first user information includes at least one of:
    login credentials of the current user,
    an employee identifier number of the current user, or
    biometric data of the current user.

13. The non-transitory processor-readable medium of claim 8, wherein the third security risk includes:
    a device setting of the client device that introduces a vulnerability to the device while the current user uses the client device;
    a remote control setting of the client device while the current user uses the client device;
    an operational state of the client device while the current user uses the client device; or
    an accessibility setting of a file, a directory, or a network resource while the current user uses the client device.

14. The non-transitory processor-readable medium of claim 8, wherein the remedial action includes:
    restricting or preventing access to a file, a directory, or a network resource while the current user uses the client device;
    permitting remote control of the client device while the current user uses the client device;
    preventing remote control of the client device while the current user uses the client device;
    limiting remote control of the client device while the current user uses the client device; or
    disabling the client device.

15. A method of automated security response, the method comprising:
    automatically sending a query to a first client device;
    receiving, from the first client device and in response to the query to the first client device, a response including first user information associated with a current user of the first client device and first device information, the current user of the first client device being a first user;
    identifying, based on the first user information and role information from a user role directory, a first role of multiple roles associated with the first user, the multiple roles including a second role that is also assigned to the first user;
    identifying a first security risk associated with the first user based on the first role and a second security risk associated with the first user based on the second role;

associating a third security risk with the first client device while the first user is using the first client device, the third security risk being greater than the first security risk and the second security risk and being based on the first user having the multiple roles;

automatically sending a query to a second client device;

receiving, from the second client device and in response to the query to the second client device, a response including second user information associated with a current user of the second client device and second device information, the second device information being substantially similar to the first device information;

identifying, based on the second user information and the role information from the user role directory, a third role of the current user of the second client device, the third role different from the first role and the second role;

identifying, based on the third role, a fourth security risk associated with the second client device while the current user of the second client device is using the second client device;

identifying a first remedial action based on the third security risk, the first remedial action configured for implementation while the first user is using the first client device to mitigate the third security risk;

identifying a second remedial action based on the fourth security risk and the second role, the second remedial action different from the first remedial action, the second remedial action configured for implementation while the current user of the second client device is using the second client device to mitigate the fourth security risk associated with the second client device;

sending a signal to the first client device to implement the first remedial action on the first client device while the first user of the first client device is using the first client device; and sending a signal to the second client device to implement the second remedial action on the second client device while the current user of the second client device is using the second client device.

16. The method of claim 15, wherein each of the first device information and the second device information includes at least one of an indication of a software version, an indication of an operating system, an indication of an application running on the first client device, an indication of a setting of the first client device, or an indication of a software patch level.

17. The method of claim 15, wherein the user role directory includes an Active Directory database.

18. The method of claim 15, wherein the third security risk includes:
   a device setting that introduces a vulnerability to the first client device while the current user uses the first client device;
   a remote control setting of the first client device while the current user uses the first client device;
   an operational state of the first client device while the current user uses the first client device; or
   an accessibility setting of a file, a directory, or a network resource while the current user uses the first client device.

19. The method of claim 15, wherein the first remedial action includes:
   restricting or preventing access to a file, a directory, or a network resource while the first user uses the first client device;
   permitting remote control of the first client device while the first user uses the first client device;
   preventing remote control of the first client device while the first user uses the first client device;
   limiting remote control of the first client device while the first user uses the first client device; or
   disabling the first client device.

20. The method of claim 15, wherein further comprising:
   automatically sending a query to a third client device;
   receiving, from the third client device, a response including third user information of a third user that is a current user of the third client device;
   identify, based on the third user information and the role information from the user role directory, a role of the third user; and
   identify, for the third client device, no security risk associated with the role of the third user while the third user is using the third client device.

21. The method of claim 15, wherein the query is automatically sent according to a predetermined schedule.

* * * * *